(12) United States Patent
Kerrigan et al.

(10) Patent No.: US 6,229,699 B1
(45) Date of Patent: May 8, 2001

(54) PACKAGING APPARATUS AND METHOD FOR NETWORKS COMPUTER CHASSIS

(75) Inventors: Brian Michael Kerrigan, Austin; Jeffrey William Young, Round Rock, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/174,609

(22) Filed: Oct. 19, 1998

(51) Int. Cl.[7] .................................. G06F 1/16; H05K 7/10
(52) U.S. Cl. ...................... 361/684; 361/758; 174/138 G
(58) Field of Search ........................................ 361/684, 685, 361/742, 758, 767, 770, 804; 439/76.1; 174/138 G; 248/638

(56) References Cited

U.S. PATENT DOCUMENTS

| | | | |
|---|---|---|---|
| 5,563,770 | * 10/1996 | Bethurum | 361/737 |
| 5,691,504 | * 11/1997 | Sands et al. | 174/35 R |
| 5,721,671 | * 2/1998 | Ruque | 361/796 |
| 5,973,926 | * 10/1999 | Sacherman et al. | 361/759 |
| 5,978,232 | * 11/1999 | Jo | 361/796 |
| 6,021,041 | * 2/2000 | Genix et al. | 361/685 |

* cited by examiner

Primary Examiner—Lynn D. Feild
(74) Attorney, Agent, or Firm—Casimer K. Salys; Felsman, Bradley, Vaden, Gunter & Dillon, LLP

(57) ABSTRACT

A network computer has a chassis with four wall-like frame members located at its rectangular perimeter. A motherboard having a variety of electronic components is mounted to the chassis within the rectangular perimeter. The chassis is mounted within a metallic enclosure with very small clearances between the components on the motherboard and the enclosure. The enclosure closely receives the chassis to eliminate excessive movement therebetween and to minimize the size of the computer. A strut extends between the frame members for enhancing the strength of the chassis and protecting the components. The strut has insulated stand-offs which are rigidly secured to and extend through the motherboard. The ends of the stand-offs are also very close to or in contact with sidewalls of the enclosure. The strut protects the components from being short circuited to the sidewalls by transmitting force on one of the sidewalls through the stand-offs to the other sidewall.

14 Claims, 3 Drawing Sheets

PACKAGING APPARATUS AND METHOD FOR NETWORKS COMPUTER CHASSIS

TECHNICAL FIELD

This invention relates in general to electronic computers and in particular to packaging and insulating a motherboard on a network computer chassis inside an external housing.

BACKGROUND ART

Network computers contain a variety of electronic components such as a motherboard, connectors, a hard disk drive and the like. Each of the components is rigidly mounted to an internal frame or chassis. A thin profile, external housing or enclosure is removably attached to the chassis for allowing the user access to the components. The enclosure also protects the components from physical contact and shields the components from electromagnetic interference (EMI). In a network computer, the clearances between the components and the enclosure are minimized in order to reduce its overall size as much as possible.

In the prior art, enclosures for network computers have been formed from a variety of materials including metals and plastics. The tight clearances of network computers require those with electrically conductive metallic enclosures to somehow protect or insulate the internal components. The components could be damaged or destroyed if they accidentally contact or ground against the metal enclosure. An improved network computer design for protecting internal components is needed.

DISCLOSURE OF THE INVENTION

A network computer has a chassis with four wall-like frame members located at its rectangular perimeter. A motherboard having a variety of electronic components is mounted to the chassis within the rectangular perimeter. The chassis is mounted within a metallic enclosure with very small clearances between the components on the motherboard and the enclosure. The enclosure closely receives the chassis to eliminate excessive movement therebetween and to minimize the size of the computer. A strut extends between the frame members for enhancing the strength of the chassis and protecting the components. The strut has insulated stand-offs which are rigidly secured to and extend through the motherboard. The ends of the stand-offs are also very close to or in contact with sidewalls of the enclosure. The strut protects the components from being short circuited to the sidewalls by transmitting force on one of the sidewalls through the stand-offs to the other sidewall.

BEST MODE FOR CARRYING OUT THE INVENTION

Figure 1:
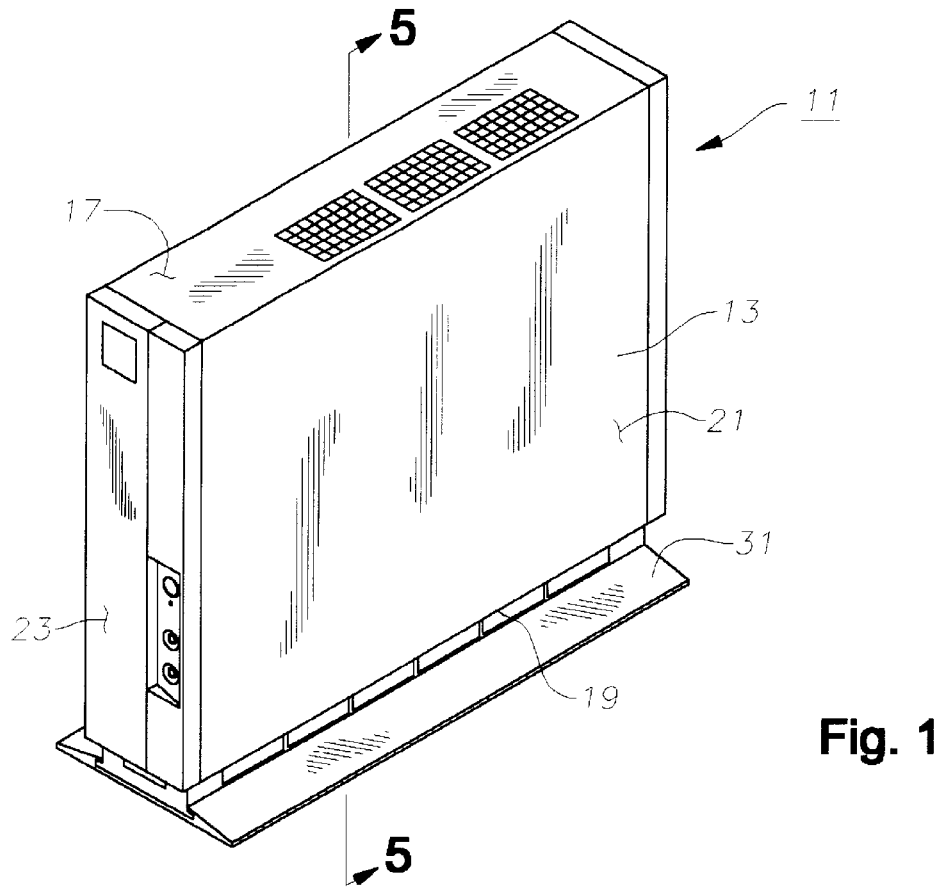
FIG. 1 is a front isometric view of a computer constructed in accordance with the invention.
Figure 2:
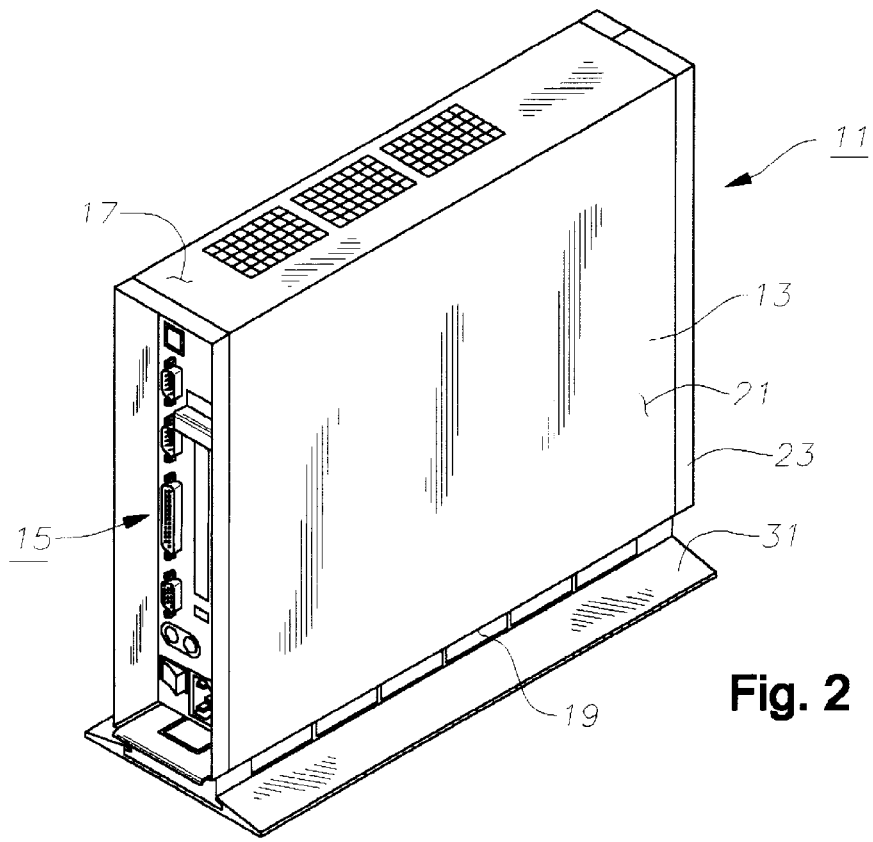
FIG. 2 is a rear isometric view of the computer of FIG. 1.

Referring to FIGS. 1 and 2, a network computer 11 is shown. Computer 11 has an external metal housing or enclosure 13 and an internal metal frame or chassis 15. Enclosure 13 is essentially a five-sided rectangular box with an opening on a rearward end. Enclosure 13 has a top panel 17, a bottom panel 19, and two side panels 21, all of which are formed from a single sheet of metal which is bent to form four corners. A front panel 23 is integrally joined to the forward end of enclosure 13. A base or pedestal 31 is mounted to the lower surface of bottom panel 19.

Figure 3:
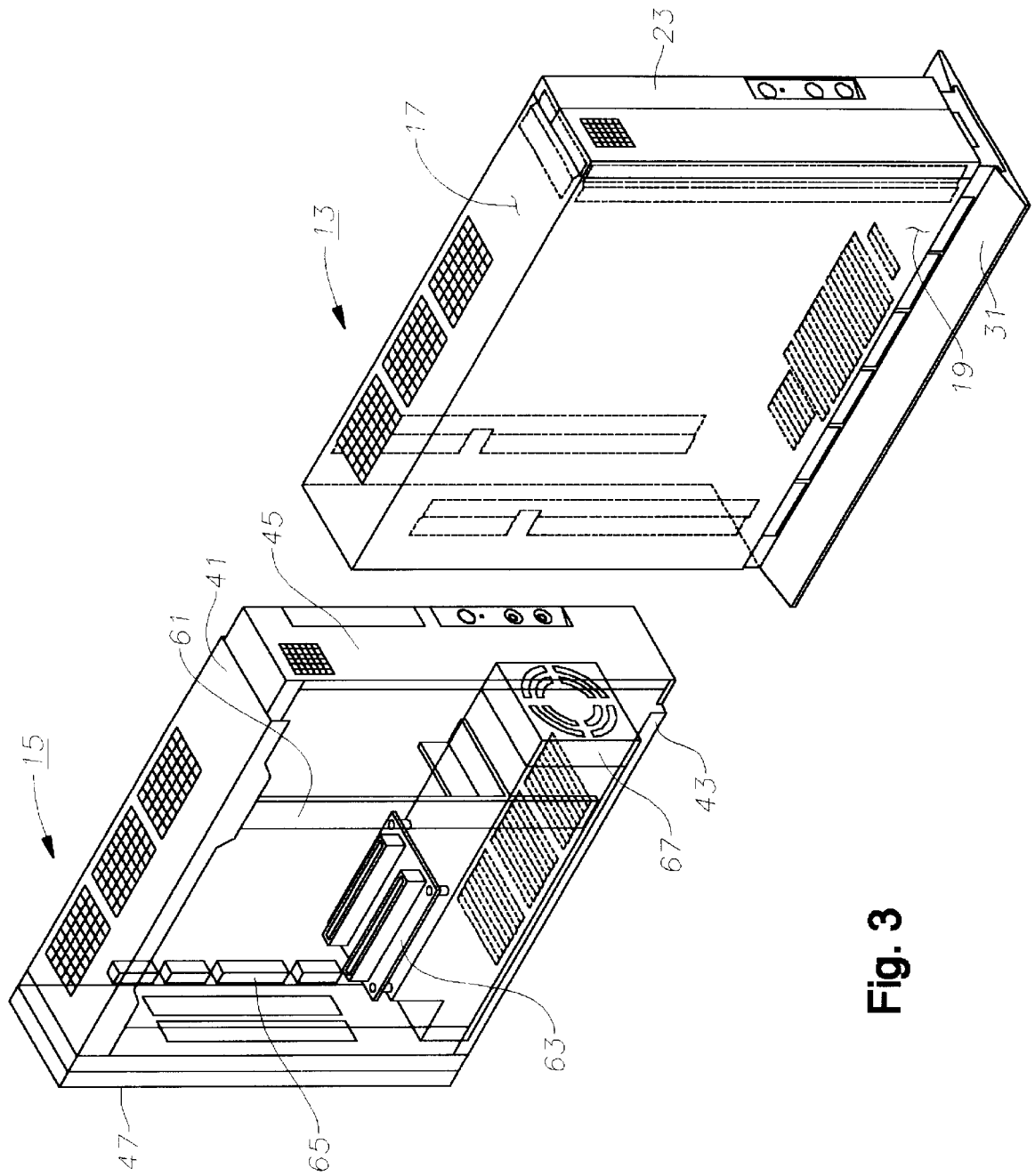
FIG. 3 is a front isometric, partially transparent view of the computer of FIG. 1 shown with its chassis removed from its enclosure.

As shown in FIG. 3, chassis 15 is sidably mounted within enclosure 13. Chassis 15 has a rectangular perimeter of four wall-like frame members including a top 41, a bottom 43 and front and rear ends 45, 47. This configuration allows the vertical sides of chassis 15 to remain open and uncovered. A strut 61 is mounted and extends vertically between top 41 and bottom 43. Chassis 15 also has a plurality of electronic components such as printed circuit boards 63, connectors 65, a ventilation fan 67 and the like mounted to it. For simplicity, only a few of the components of computer 11 are illustrated.

Figure 4:
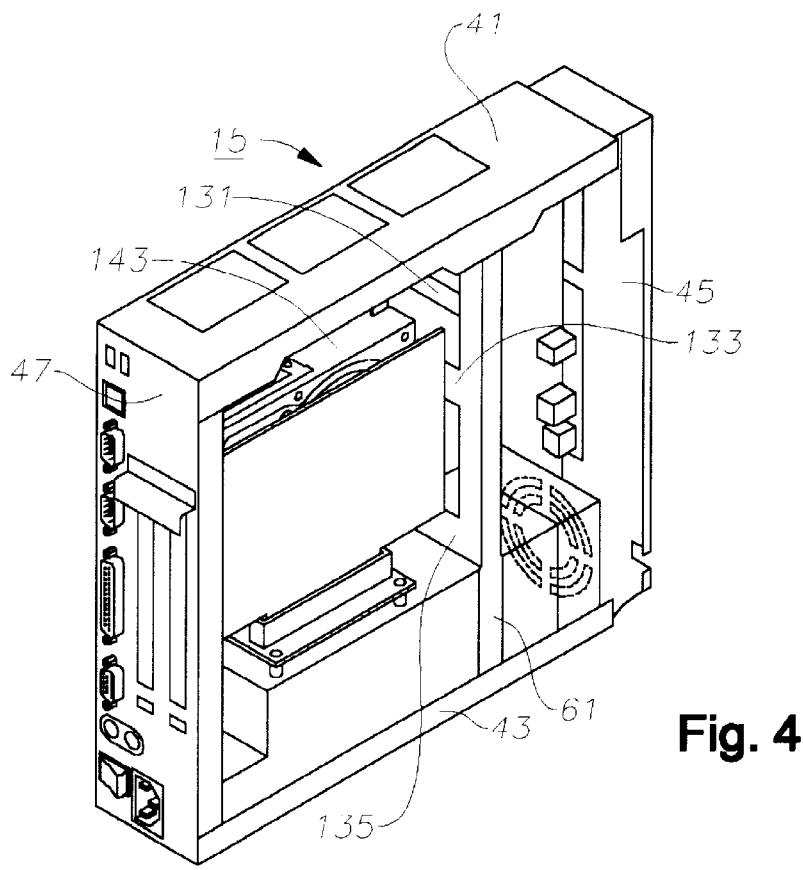
FIG. 4 is a rear isometric view of the chassis of FIG. 3 shown with its electronic components.
Figure 5:
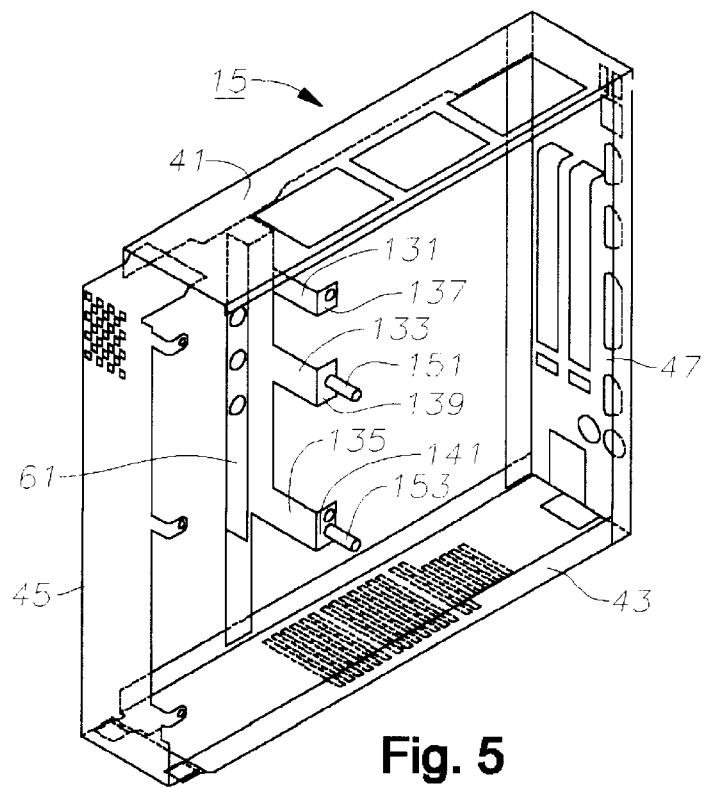
FIG. 5 is a front isometric view of the chassis of FIG. 3 shown with its electronic components removed.
Figure 6:
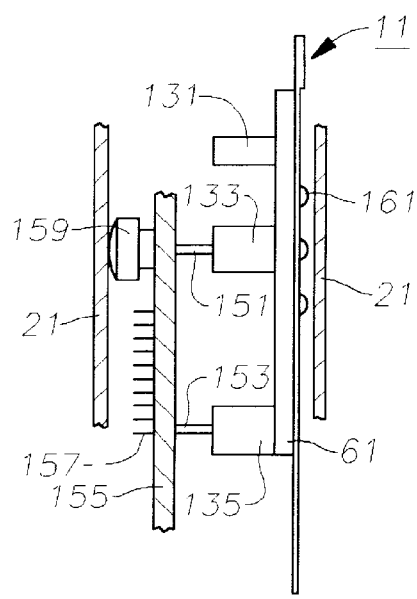
FIG. 6 is a sectional end view of a central portion of the computer of FIG. 1 taken along the line 5—5 of FIG. 1.

Referring now to FIGS. 4–6, chassis 15 and strut 61 are shown in greater detail. Strut 61 has a brace-type body which extends vertically between top 41 and bottom 43 on one side. Strut 61 also has three perpendicular legs 131, 133, 135 which extend horizontally from its body. Leg 131 is shorter than legs 133, 135. Each leg 131, 133, 135 has a small perpendicular flange 137, 139, 141, respectively, on its distal end. Legs 131 and 135 may be used to support one end of a hard disk drive 143 on chassis 15. Each leg 133 and 135 also has an extension or pin 151, 153 which extends horizontally from its distal end beyond flanges 139, 141, respectively. Pins 151, 153 are provided for attaching one a midportion of a motherboard 155 to chassis 15 near one of its sides. Motherboard 155 has a plurality of electrical pins 157 extending through it from board-mounted connectors (not shown). Pins 151, 153 may extend through motherboard 155 and have a insulated support button 159 mounted to them on an opposite side of motherboard 155. One or more insulating buttons 161 may also be mounted to strut 61 on the opposite side of button 159.

In operation, enclosure 13 closely receives chassis 15 such that top panel 17 and bottom panel 19 slidably abut top 41 and bottom 43. In addition, the vertical side edge portions of top 41 and bottom 43 slidably engage side panels 21 to eliminate excessive movement between chassis 15 and enclosure 13.

As shown in FIG. 6, the insulating buttons 159, 161 are located very close to or in contact with side panels 21 of enclosure 13. Since side panels 21 are formed from thin sheet metal, they may be accidentally deflected inward and could cause the contacts 157 extending from motherboard 155 or other electrical components to short circuit. Strut 61 prevents this from happening by transmitting a force applied to one side panel 21 to the other side panel 21 without allowing contact of the components within enclosure 13. For example, if a force was applied to the side panel 21 on the left side of FIG. 6, it would deflect slightly inward and touch button 159 almost immediately, thereby maintaining space between side panel 21 and contacts 157. The force would then be transmitted through pin 151, leg 133 and the brace-type body of strut 61 and applied to chassis 15 and the side panel 21 on the right side of FIG. 6.

The invention has significant advantages. The strut described herein prevents components on the motherboard from being accidentally short circuited. This is accomplished by transmitting force from one metallic sidewall of the enclosure to the other sidewall without allowing contact of the components within the enclosure.

While the invention has been shown or described in only some of its forms, it should be apparent to those skilled in the art that it is not so limited, but is susceptible to various changes without departing from the scope of the invention. For example, the invention may be used to attenuate EMI in enclosures housing telecom, radio frequency and other types of electronic equipment.

We claim:

1. A computer, comprising:

an enclosure having electrically conductive first and second sidewalls;

a chassis mounted in the enclosure;

an electrical component mounted to the chassis adjacent to the first sidewall and having electrical contacts protruding toward the first sidewall; and a strut mounted in the computer such that portions of the strut are adjacent to each of the sidewalls of the enclosure for transmitting a deflecting force applied to the first sidewall through the strut to the second sidewall to prevent the first sidewall from contacting the contacts of the component.

2. The computer of claim 1 wherein the strut is connected to the component and to the chassis.

3. The computer of claim 1 wherein the strut includes a button mounted between the first sidewall and the component and maintains a gap therebetween which is greater than a length of the contacts of the component.

4. The computer of claim 1, further comprising a standoff mounted to the strut adjacent to the second sidewall.

5. The computer of claim 1 wherein the component comprises a circuit board having first and second sides, and wherein the strut has a base mounted to the chassis and a leg which protrudes past the electrical contacts toward the first sidewall.

6. The computer of claim 1 wherein the component is a circuit board having a plurality of electrical devices mounted to it.

7. The computer of claim 1, further comprising:

an insulated first button mounted to the strut adjacent to the second sidewall; and an insulated second button mounted between the first sidewall and the component, the second button maintaining a gap between the component and the first sidewall which is greater than a length of the contact of the component.

8. The computer of claim 1 wherein the strut has a width that is approximately equal to a distance between the sidewalls of the enclosure.

9. A computer, comprising:

an enclosure having electrically conductive sidewalls;

a chassis mounted in the enclosure;

a circuit board mounted to the chassis adjacent to one of the sidewalls, the circuit board having a plurality of electronic components with electrical contacts mounted to and extending through it adjacent to said one of the sidewalls;

a strut mounted to the chassis and extending through the circuit board such that portions of the strut are immediately adjacent to each of the sidewalls of the enclosure for transmitting a deflecting force applied to one of the sidewalls through the strut and circuit board to the other of the sidewalls to prevent the sidewalls from touching the contacts of the components.

10. The computer of claim 9 wherein the strut has a body which is mounted to the chassis adjacent to one of the sidewalls, a perpendicular leg extending from the body to the circuit board, and an end portion which is adjacent to the other of the sidewalls.

11. The computer of claim 9 wherein the strut includes a button mounted between said one of the sidewalls and the component and maintains a gap therebetween which is greater than a length of the contacts of the components.

12. The computer of claim 9, further comprising:

an insulated first button mounted to the strut adjacent to said other of the sidewalls; and an insulated second button mounted between said one of the sidewalls and the circuit board, the second button maintaining a gap therebetween which is greater than a length of the contact of the component.

13. A computer, comprising:

an enclosure having electrically conductive sidewalls;

a chassis having a series of frame members mounted in the enclosure;

a circuit board mounted to the chassis adjacent and parallel to at least one of the sidewalls of the enclosure, the circuit board having a plurality of electronic components mounted to it;

a strut having a brace mounted between the frame members adjacent to one of the sidewalls, and perpendicular legs which span a width of the computer, wherein at least one of the legs is secured to and extends through the circuit board adjacent to the other of the sidewalls;

an insulative button mounted to a distal end of the at least one leg adjacent to the other of the sidewalls; and wherein a force applied to either of the sidewalls is transmitted through the strut and circuit board to the sidewall on the opposite side of the enclosure in order to prevent the sidewalls from contacting the circuit board and its components.

14. The computer of claim 13, further comprising a second insulative button mounted to the brace adjacent to said one of the sidewalls and opposite to said insulative button.

* * * * *